United States Patent
Hanaoka

(10) Patent No.: US 7,585,143 B2
(45) Date of Patent: Sep. 8, 2009

(54) STOCKER APPARATUS

(75) Inventor: Yukihiro Hanaoka, Nagano (JP)

(73) Assignee: Tsubaki Seiko, Inc., Nagano (JP)

( * ) Notice: Subject to any disclaimer, the term of this patent is extended or adjusted under 35 U.S.C. 154(b) by 538 days.

(21) Appl. No.: 10/528,738

(22) PCT Filed: Sep. 22, 2003

(86) PCT No.: PCT/JP03/12068

§ 371 (c)(1),
(2), (4) Date: Mar. 22, 2005

(87) PCT Pub. No.: WO2004/028933

PCT Pub. Date: Apr. 8, 2004

(65) Prior Publication Data

US 2006/0127204 A1 Jun. 15, 2006

(30) Foreign Application Priority Data

Sep. 25, 2002 (JP) .............................. 2002-279781

(51) Int. Cl.
*B65G 1/12* (2006.01)

(52) U.S. Cl. ...................... 414/331.02; 414/331.01; 414/331.04; 414/331.11; 414/331.14; 414/564; 211/126.11; 198/465.3

(58) Field of Classification Search ............ 414/331.01, 414/331.04, 331.11, 331.14, 564, 788.8; 211/126.11; 198/465.3

See application file for complete search history.

(56) References Cited

U.S. PATENT DOCUMENTS

| | | | | |
|---|---|---|---|---|
| 3,951,228 A | * | 4/1976 | Schnell ..................... 181/200 |
| 3,974,922 A | * | 8/1976 | Selusnik et al. .......... 414/796.8 |
| 4,588,341 A | * | 5/1986 | Motoda .................. 414/788.4 |
| 4,701,096 A | * | 10/1987 | Fisher, Jr. .............. 414/416.08 |
| 5,103,087 A | * | 4/1992 | Hofliger et al. ......... 250/223 B |

FOREIGN PATENT DOCUMENTS

| | | |
|---|---|---|
| GB | 2337325 | 11/1999 |
| JP | 5-178463 | 7/1993 |
| JP | 6-9016 | 1/1994 |
| JP | 11-319740 | 11/1999 |

* cited by examiner

*Primary Examiner*—Michael S Lowe
(74) *Attorney, Agent, or Firm*—Mark Montague; Cowan, Liebowitz & Latman, P.C.

(57) ABSTRACT

A stocker apparatus includes a first tray stock section (70) for storing a plurality of empty trays (11a), a second tray stock section (80) for storing the plurality of empty trays (11a) loaded with products, tray supporting means (130) provided in the first tray stock section (70) and the second tray stock section (80) for mounting the trays (11) thereon, and lifting and lowering means for lifting and lowering the tray supporting means (130). The stocker apparatus further includes carrier means (140) for carrying the loaded tray to the second tray stock section (80). The stocker apparatus further includes an outer wall constituting member covering the first tray stock section (70) and the second tray stock portion (80) for shielding the first tray stock section (70) and the second tray stock section (80) from an external atmosphere.

5 Claims, 10 Drawing Sheets

STOCKER APPARATUS

TECHNICAL FIELD

The present invention relates to a stocker apparatus capable of loading products on an empty tray and stocking many loaded trays stacked one on the other.

BACKGROUND ART

Generally, a stocker apparatus is used, for example, when resin molded articles such as resin gears are manufactured by a resin molding apparatus. The stocker apparatus loads on an empty tray existing therein the molded articles manufactured by the resin molding apparatus and then carried by an external carrier such as a robot or the like, and stocks many trays, which are loaded with the molded articles, stacked one on the other.

A currently available stocker apparatus includes a first tray stock section where empty trays are stocked and a second tray stock section where loaded trays are stocked. In the first tray stock section, many empty trays are stocked, stacked one on the other. The stocker apparatus further has lifting and lowering means which lift and lower the trays existing in the first tray stock section and the second tray stock section, and carrier means for carrying the loaded trays to the second tray stock section.

The stocker apparatus is provided in a manner to be open to the outside with the trays and the molded articles being exposed to an external atmosphere.

Incidentally, stocker apparatuses described in documents include one described in, for example, Japanese Padent Laid-open No. Hei 6-9016, though it is of a different type. However, there is no other document known at present which describes a stocker apparatus of the above-described type in which many trays are stacked one on the other. Note that the stocker apparatus is also called as a stock system or a stocker.

Incidentally, in the current stocker apparatus, the empty trays and the loaded trays are stacked in a manner to be open to the outside. In addition, when the resin molded articles are manufactured, a crusher that crushes a runner (unnecessary portion) separated from the resin molded articles is often installed, creating an environment containing much dust.

For this reason, if the stocker apparatus is exposed to the atmosphere containing much dust such as in a factory, much dust adheres to a tray and a loaded tray stacked at the uppermost tier. If dust adheres to the aforementioned tray and the loaded trays, the dust actually adheres to the manufactured molded articles, and the adhesion of dust is not preferable from the aspect of sanitary especially when the molded articles are containers for food (for example, egg cases and so on made of resin).

Further, adhesion of dust to, for example, precision electronic components and so on will cause defects. For this reason, the molded articles for precision products sometimes need to be cleaned sufficiently prior to being assembled as products.

Besides, downsizing of the stocker apparatus itself has not been under consideration since the current stocker apparatus cooperates with large resin molding apparatus and external carrier, and therefore even a large stocker apparatus is acceptable. As a result of this, the stocker apparatus generally occupies a large space. This brings about a problem of installation of a stocker apparatus not being allowed when installation space is limited.

Furthermore, the current stocker apparatus is expensive relative to its function of simple loading. Stocker apparatuses may be, for example, as expensive as a resin molding apparatus and, in some case, more expensive than a resin molding apparatus. In a field of resin molding, however, the stocker apparatus is handled as an apparatus attached to the resin molding apparatus, and accordingly the function and cost are sufficiently examined for the resin molding apparatus, whereas the stocker apparatus has been employed without sufficient consideration even if it is slightly expensive.

The present invention has been developed based on the above-described circumstances, and its object is to provide a stocker apparatus capable of loading products on trays with the products and trays kept clean. In addition to the above-descried object, an object of another invention is to provide a stocker apparatus capable of reducing in size and cost.

SUMMARY OF THE INVENTION

A stocker apparatus of the present invention includes: a first tray stock section capable of stocking a plurality of empty trays; a second tray stock section capable of stocking a plurality of loaded trays, the loaded trays being the empty trays loaded with products; tray supporting means provided in the first tray stock section and the second tray stock section respectively for supporting the trays; lifting and lowering means for lifting and lowering the tray supporting means; and carrier means for carrying the loaded tray to the second tray stock section when the products are loaded on the empty tray existing in the first tray stock section, the apparatus further including: an outer wall constituting member covering at least side surfaces and upper surfaces of the first trays stock section and the second tray stock section to separate the first tray stock section and the second tray stock section from an external atmosphere; an opening provided at an upper portion of the first tray stock section, the opening allowing the products to be carried in therethrough; an ionizer provided near the opening, the ionizer jetting ionized air to the products carried in through the opening, the products then being loaded on the empty tray; and an air cleaning means provided at an upper portion of the second tray stock section, the air cleaning means cleaning outside air and then introducing the air into the second tray stock section.

The outer wall constituting member is provided as described above, whereby the first tray stock section and the second tray stock section existing in the stocker apparatus are shielded from the external atmosphere. This can prevent dust from adhering to the trays stocked in the first tray stock section and the second tray stock section even when the external atmosphere contains a large amount of dust. Further, it is also possible to prevent the dust from adhering to the products loaded on the empty tray.

Further, the opening provided at the upper portion of the first tray stock section allows the products to be carried in through the opening, and the opening is provided at a part of an area formed by the outer wall constituting member, whereby the opening portion communicating with the outside can be minimized.

Further, the ionizer is provided near the opening so that the ionized air is blown to the products when the product passes through the opening. This can remove the dust adhering to the products. In particular, dust apt to adhere to charged products no longer adheres to the products by eliminating electricity from the products by the ionized air. Further, the ionized air can also be used to perform sterilization treatment on the products.

Furthermore, the air cleaning means is provided at the upper portion of the second tray stock section, thereby cleaning air taken in from the outside and then supplying the air into the second tray stock section. Thus, in the second tray stock section, the cleaned air moves downward from above, thus keeping the atmosphere therein clean.

Further, in the stocker apparatus of the present invention, in addition to the above-described invention, the outer wall constituting member includes a frame, an elastically deformable sealing member abutting on the frame in a longitudinal direction thereof, a panel member abutting on the sealing member, and a pad member abutting on the panel member in a manner to cover an outer edge thereof and fixedly attached to the frame member to thereby elastically hold the panel member with the sealing member therebetween.

In this invention, the outer wall constituting member can seal the inside of the stocker apparatus without generating dust from screw holes and so on when panel members are attached. This can prevent dust from entering the inside of the stocker apparatus from the outside and the panel member portion, thus stocking the trays and the products loaded on the trays in a clean state.

Further, in the stocker apparatus of the present invention, in addition to the above-described stocker apparatus, each of the lifting and lowering means has four annular belts for supporting each of the tray supporting means at four points, the annular belt being formed by superposing one end on another end of a straight belt having both the ends and fixedly holding the ends by a both end fixing member, and the both end fixing member being located outside a winding round of the annular belt.

In this invention, the both end fixing member is used to fixedly hold the straight belt with its both ends superposed, whereby the belt length of the annular belt can be freely set by arbitrarily adjusting the length where the one end side and the other end side are superposed. This eliminates the necessity to use an endless belt which is initially formed in an annular shape, resulting in reduced cost relative to use of the endless belt.

Further, the both end fixing member can be located outside the winding round of the annular belt to prevent the both end fixing member from interfering with the pulley around which the annular belt is stretched. By preventing interference between the pulley and the both end fixing member as described above, the driving distance of the annular belt to which the tray supporting means is attached can be increased. This improves the size efficiency of the stocker apparatus, which allows much more trays to be stocked therein. In addition, the stocker apparatus can be reduced in size.

Furthermore, in the stocker apparatus of the present invention, in addition to the above-described stocker apparatus of the invention, the straight belt is a straight toothed belt, and one end side or another end side of the straight toothed belt is bent 180 degrees and then the one end side and the other end side are superposed and fixedly held by the both end fixing member.

In this invention, the toothed belt is used and the one end side or the other end side thereof is bent 180 degrees and then the one end side and the other end side are superposed, so that they are superposed with the tooth portions on the one end side and the tooth portions on the other end side meshing with each other. The both end fixing member fixedly holding the toothed belt in this state can prevent slippage of the toothed belt and reduce the space of the superposed portion.

Further, a stocker apparatus of the present invention includes: a first tray stock section capable of stocking a plurality of empty trays; a second tray stock section capable of stocking a plurality of loaded trays, the loaded trays being the empty trays loaded with products; tray supporting means provided in the first tray stock section and the second tray stock section respectively for supporting the trays; lifting and lowering means for lifting and lowering the tray supporting means; and carrier means for carrying the loaded tray to the second tray stock section when the products are loaded on the empty tray existing in the first tray stock section, the apparatus further including: an outer wall constituting member covering at least side surfaces and upper surfaces of the first trays stock section and the second tray stock section to separate the first tray stock section and the second tray stock section from an external atmosphere; an opening provided at an upper portion of the first tray stock section, the opening allowing the products to be carried in therethrough; and an ionizer provided near the opening, the ionizer jetting ionized air to the products carried in through the opening, the products then being loaded on the empty tray, wherein the outer wall constituting member includes a frame, an elastically deformable sealing member abutting on the frame in a longitudinal direction thereof, a panel member abutting on the sealing member, and a pad member abutting on the panel member in a manner to cover an outer edge thereof and fixedly attached to the frame member to thereby elastically hold the panel member with the sealing member therebetween.

In this invention, the outer wall constituting member is provided, whereby the first tray stock section and the second tray stock section are shielded from the external atmosphere, thus making it possible to prevent dust from adhering to the trays stocked in the first tray stock section and the second tray stock section even when the external atmosphere contains a large amount of dust. Further, it is also possible to prevent the dust from adhering to the products loaded on the empty tray. Further, the opening is provided at a part of an area formed by the outer wall constituting member of the upper portion of the first tray stock section, whereby the opening portion communicating with the outside can be minimized.

Further, the ionizer is provided near the opening so that the ionized air is blown to the products when the product passes through the opening, thus removing the dust adhering to the products. This eliminates electricity from the products, so that charged dust or the like no longer adheres to the products. Further, the ionized air can also be used to perform sterilization treatment on the products.

Furthermore, the air cleaning means is provided at the upper portion of the second tray stock section, thereby cleaning air taken in from the outside and keeping the atmosphere in the second tray stock section clean. Further, the inside of the stocker apparatus can be sealed without generation of dust from screw holes and so on when panel members are attached. This can prevent dust from entering the inside of the stocker apparatus from the outside and the panel member portion, thus stocking the trays and the products loaded on the trays in a clean state.

Further, a stocker apparatus of the present invention includes: a first tray stock section capable of stocking a plurality of empty trays; a second tray stock section capable of stocking a plurality of loaded trays, the loaded trays being the empty trays loaded with products; tray supporting means provided in the first tray stock section and the second tray stock section respectively for supporting the trays; lifting and lowering means for lifting and lowering the tray supporting means; and carrier means for carrying the loaded tray to the second tray stock section when the products are loaded on the empty tray existing in the first tray stock section, the apparatus further including: an outer wall constituting member covering at least side surfaces and upper surfaces of the first trays stock section and the second tray stock section to separate the first tray stock section and the second tray stock section from an external atmosphere; and an opening provided at an upper portion of the first tray stock section, the opening allowing the products to be carried in therethrough, wherein each of the lifting and lowering means has four annular belts for supporting each of the tray supporting means at four points, the annular belt being formed by superposing one end on another end of a straight belt having both the ends and fixedly holding the ends by a both end fixing member, and the both end fixing member being located outside a winding round of the annular belt, and wherein the straight belt is a straight toothed belt, and one end side or another end side of the straight toothed belt is bent 180 degrees and then the one end side and the other end side are superposed and fixedly held by the both end fixing member.

In this invention, the outer wall constituting member is provided, whereby the first tray stock section and the second tray stock section are shielded from the external atmosphere, thus making it possible to prevent dust from adhering to the trays stocked in the first tray stock section and the second tray stock section even when the external atmosphere contains a large amount of dust. Further, it is also possible to prevent the dust from adhering to the products loaded on the empty tray. Further, the opening is provided at a part of an area formed by the outer wall constituting member of the upper portion of the first tray stock section, whereby the opening portion communicating with the outside can be minimized.

Further, the both end fixing member is used to fixedly hold the straight belt with its both ends superposed, whereby the belt length of the annular belt can be freely set by arbitrarily adjusting the length where the one end side and the other end side are superposed. This eliminates the necessity to use an endless belt which is initially formed in an annular shape, resulting in reduced cost relative to use of the endless belt.

Further, the both end fixing member can be located outside the winding round of the annular belt to prevent the both end fixing member from interfering with the pulley around which the annular belt is stretched. By preventing interference between the pulley and the both end fixing member as described above, the driving distance of the annular belt to which the tray supporting means is attached can be increased. This improves the size efficiency of the stocker apparatus, which allows much more trays to be stocked therein. In addition, the stocker apparatus can be reduced in size.

Further, the toothed belt is used and the one end side or the other end side thereof is bent 180 degrees and then one end side and the other end side are superposed, so that they are superposed with the tooth portions on the one end side and the tooth portions on the other end side meshing with each other. The both end fixing member fixedly holding the toothed belt in this state can prevent slippage of the toothed belt and reduce the space of the superposed portion.

BRIEF DESCRIPTION OF DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

Figure 1:
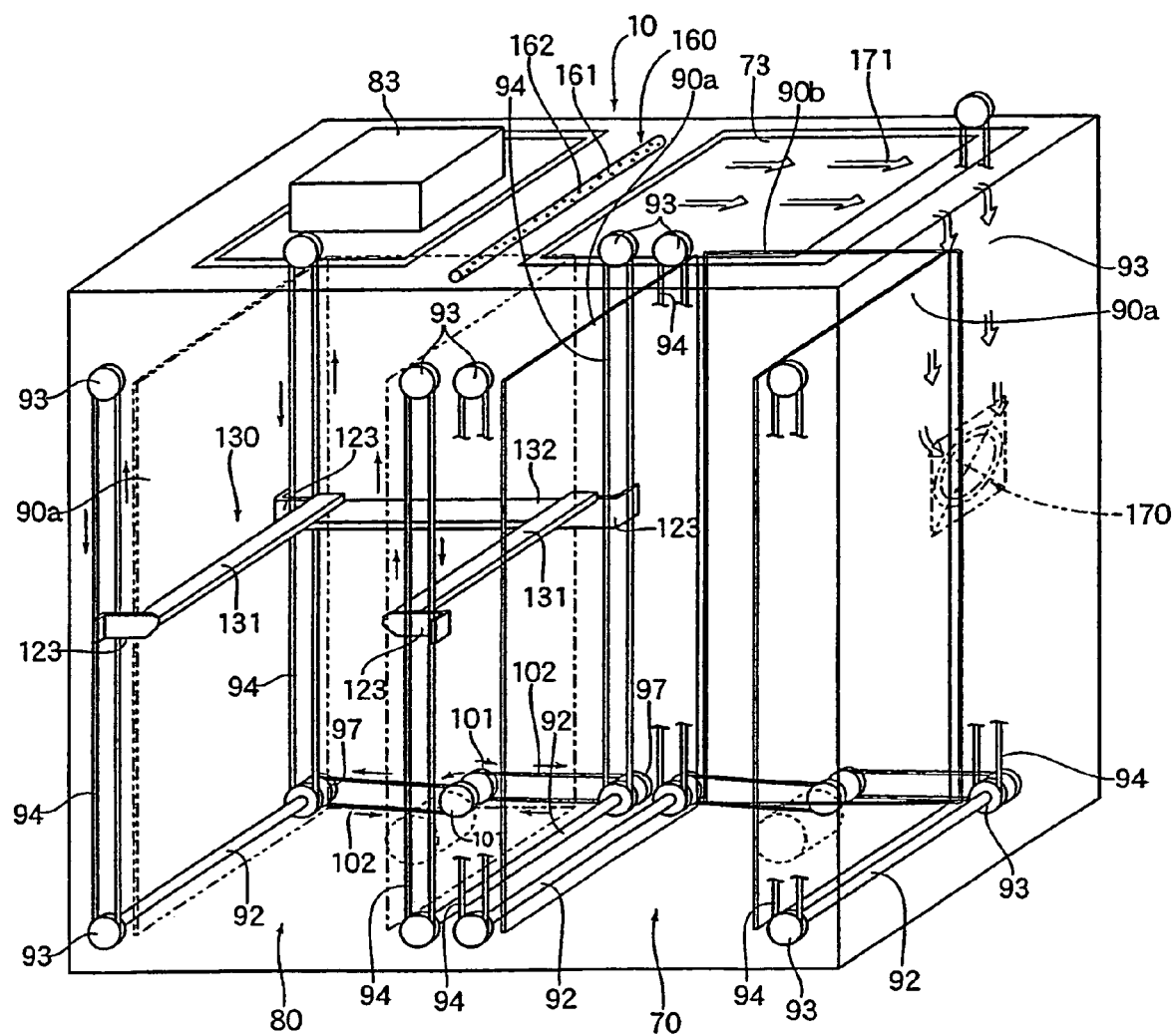
FIG. 1 is a perspective view showing a main configuration of a stocker apparatus according to an embodiment of the present invention in a sight through manner to show its internal configuration.

Hereinafter, a stocker apparatus 10 according to an embodiment of the present invention will be described based on FIG. 1 to FIG. 9. Note that FIG. 1 shows the stocker apparatus 10 in a sight through manner to show a main internal mechanism.

The stocker apparatus 10 stocks in its inside empty trays 11 (hereinafter, referred also to as empty trays 11a) before molded articles 12 (see FIG. 5) as products are loaded, and loaded trays 11 (hereinafter, referred also to as loaded trays 11b) after the molded articles 12 are loaded. In addition to stock of the trays 11, the stocker apparatus 10 also prevents the trays 11 and the molded articles 12 from being exposed to an external atmosphere containing much dust to clean the trays 11 and the molded articles 12. A structure of the stocker apparatus 10 will be described in detail below.

Figure 2:
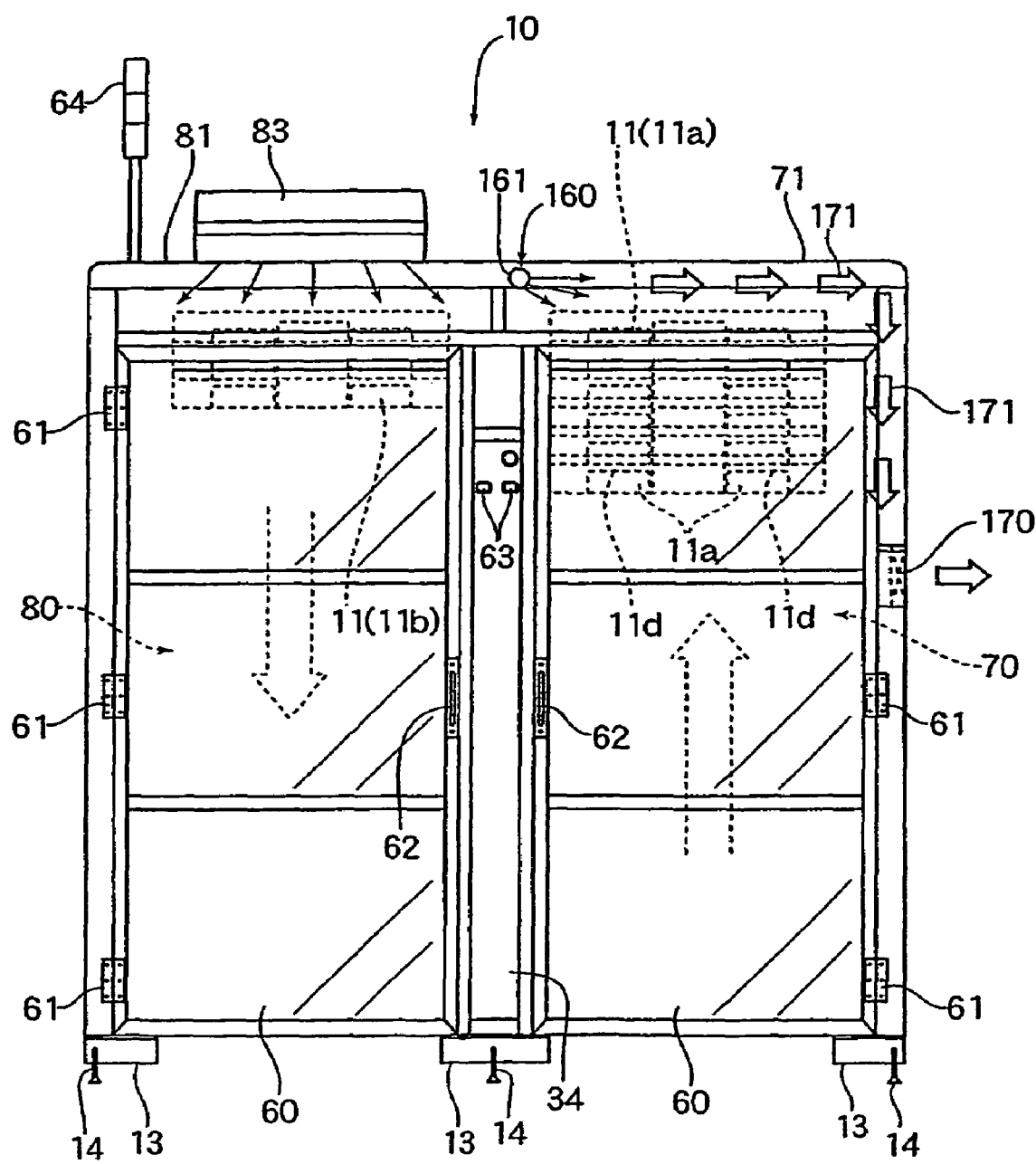
FIG. 2 is a front view showing the configuration of the stocker apparatus in FIG. 1, showing an appearance of trays existing therein and showing a destaticizing blow portion of ionized air from an ionizer.
Figure 3:
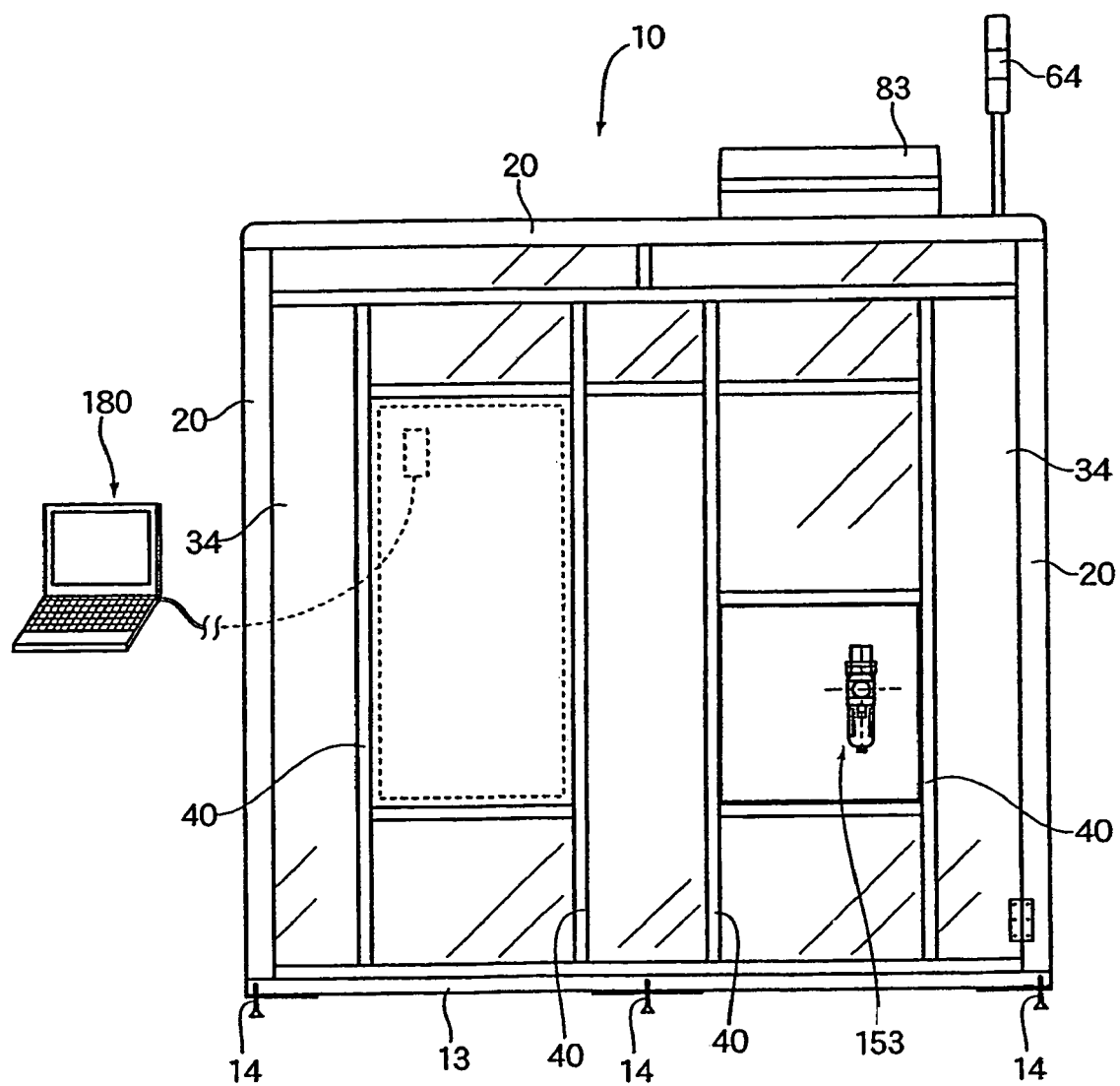
FIG. 3 is a rear view showing the configuration of the stocker apparatus in FIG. 1.
Figure 4:
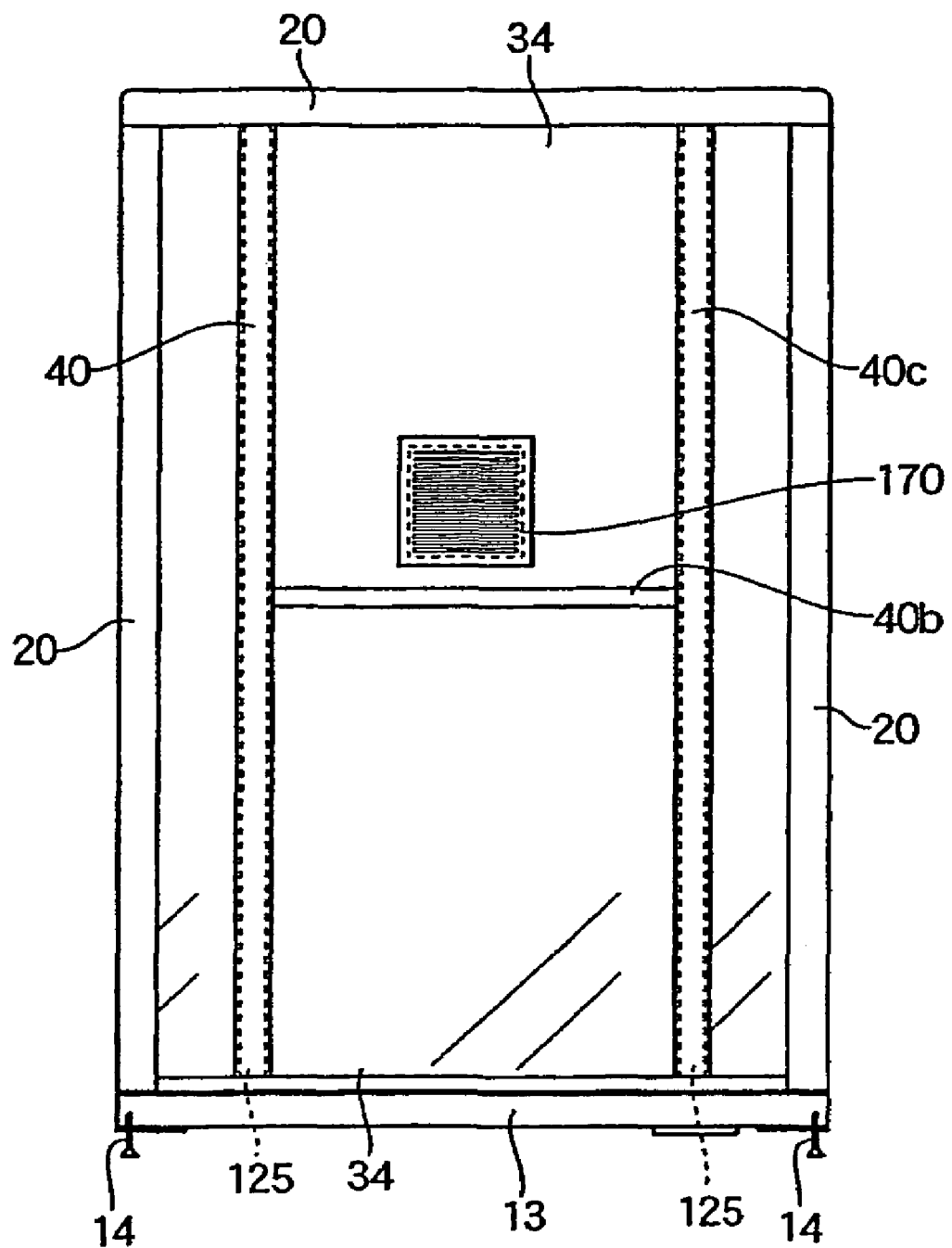
FIG. 4 is a side view showing the configuration of the stocker apparatus in FIG. 1, showing an appearance as seen from the side where an exhaust fan is provided.

As shown in FIG. 2 through FIG. 4, the stocker apparatus 10 has a supporting base 13 to which later-described frames 20 and 40 constituting a part of outer wall constituting member are attached, and the supporting base 13 is provided with a plurality of leg portions 14 projecting downward. The leg portions 14 support the whole stocker apparatus 10. In this embodiment, the leg portions 14 are fixed and not moved easily, while wheels may be provided in place of the leg portions 14 or the supporting base 13 to allow the stocker apparatus 10 to be easily moved.

Figure 7:
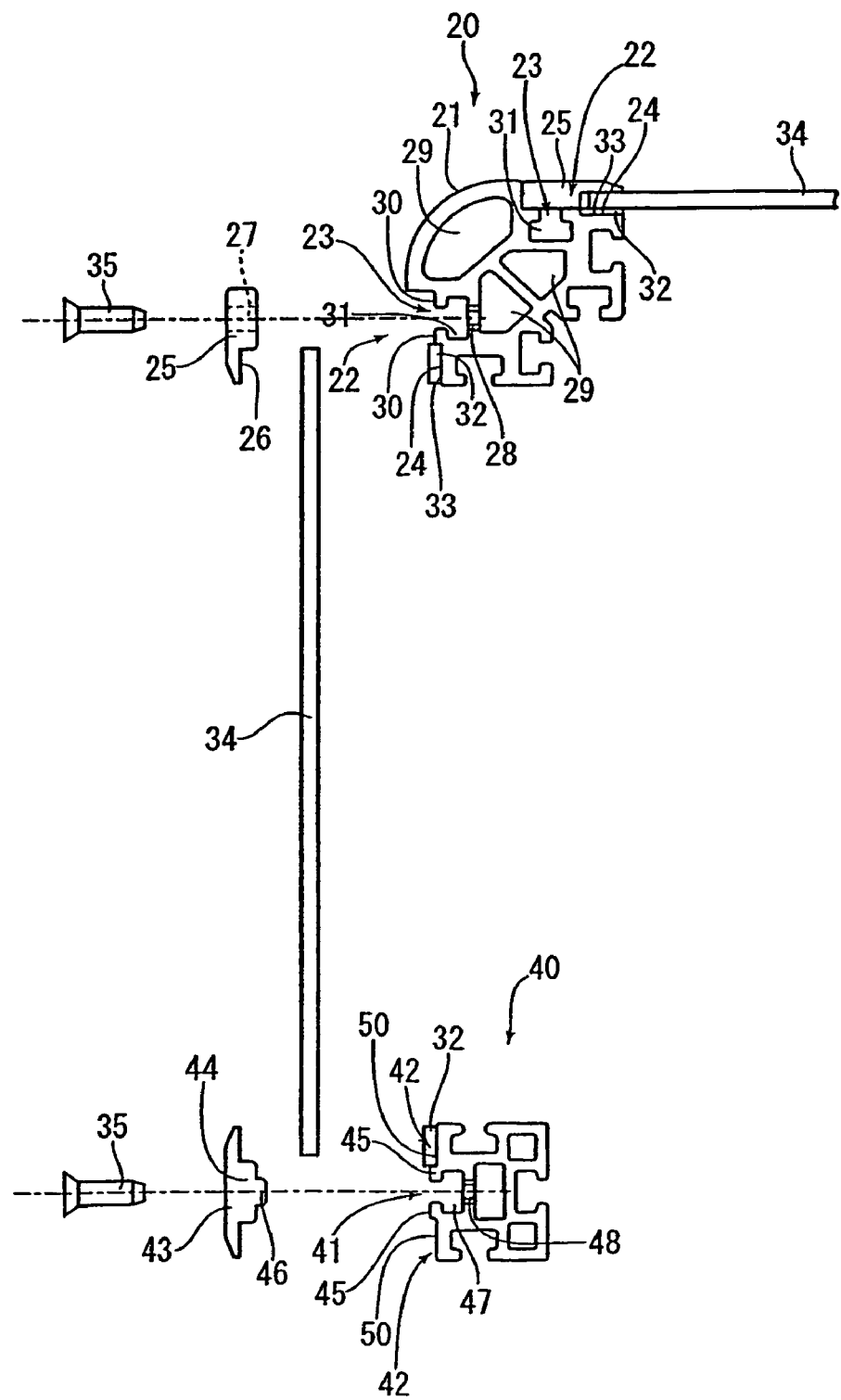
FIG. 7 is a cross-sectional view showing an appearance of an out-corner frame and a joint frame supporting plates in the stocker apparatus in FIG. 1.

The stocker apparatus 10 is provided with a plurality of frames 20 and 40 extending upward from the supporting base 13 as frame members forming the main part of the outer wall constituting member. The frames 20 and 40 are composed of aluminum structure material to have lightweight and beautiful appearance. The frames 20 and 40 are, as shown in FIG. 7, out-corner frames 20 and joint frames 40. The out-corner frame 20 is to be provided at a corner of the supporting base 13, and therefore a piece on one side of the out-corner frame 20 is rounded to form a curved corner portion 21. This is also effective in terms of prevention of injury. The corner portion 21 forms an outer edge portion of the stocker apparatus 10.

The out-corner frame 20 is also provided with two plate fixing portions 22 adjoining the corner portion 21 such that the plate fixing portions 22 are perpendicular to each other. The plate fixing portion 22 is provided with a pad abutting portion 23 and a packing abutting portion 24. On the pad abutting portion 23 of them, an S-pad 25 as a pad member, as shown in FIG. 7, is to abut. The S-pad 25 is made of, for example, resin, and the S-pad 25 having an almost rectangular-shaped cross section has a recessed portion 26 made by hollowing out the S-pad 25 at one corner in a rectangular shape. The recessed portion 26 is provided at a position corresponding to the packing abutting portion 24.

The S-pad 25 is formed with a hole portion 27 at a predetermined location along its longitudinal direction. The hole portion 27 is for allowing a screw 35 to be inserted therethrough. To fix the screw 35, a screw hole 28 is formed at an inner part (on the back side) of the pad abutting portion 23 by tapping. Note that, in this embodiment, the out-corner frame 20 has a plurality of hollow portions 29 to reduce the weight and enhance the strength. A pair of flange portions 30 constituting the pad abutting portion 23 are also provided to form opening therebetween. A portion opening between the flange portions 30 run through a space portion 31. The above-described screw hole 28 is formed in the wall surface on the back side of the space portion 31.

Further, on the packing abutting portion 24, sponge packing 32 as a sealing member is to abut that has a rectangular cross section as shown in FIG. 7. The sponge packing 32 is received by a plane portion 33 of the packing abutting portion 24 and is then covered with an end side of a plate 34 as a panel member which is formed in a flat panel and rectangular shape. Thereafter, the S-pad 25 is laid over the end side of the plate 34 and secured by screwing the screw 35 into the screw hole 28, whereby the plate 34 is fixed to the plate fixing portion 22.

Note that the above-described flange portions 30 are provided protruding further outward than the plane portion 33. The plate 34 is normally formed of plastic as its material. However, the material of plate 34 is not limited to plastic, and various materials such as metal and the like may be used.

Incidentally, curved-surface corner members (not shown) are provided at four corners on the top surface side of the corner portions along the outer edges of the stocker apparatus 10 where the out-corner frames 20 are joined together. This imparts roundness to all the corners including the out-corner frames 20.

The joint frames 40 are provided for joining the plates 34 and provided at outer peripheral portions other than the corner portions of the supporting base 13. The joint frame 40 is provided with, as shown in FIG. 7, one pad abutting portion 41 and two packing abutting portions 42.

On the pad abutting portion 41, a W-pad 43 as a pad member is to abut. The W-pad 43 shown in this drawing is formed in an almost T-shape, and a middle portion 44 of the T-shape is to abut on the pad abutting portion 41. Incidentally, the middle portion 44 has a positioning portion 46 projectingly formed which is fitted into a gap between flange portions 45 to position the W-pad 43.

In the pad abutting portion 41, the pair of flange portions 45 are provided to form opening therebetween as in the above case, and the opening run through a space portion 47. Further, a screw hole 48 is formed in the wall surface on the back side of the space portion 47. The flange portions 45 are also provided protruding further outward than plane portions 50 of the packing abutting portions 42.

The packing abutting portion 42 is a portion on which sponge packing 32 similar to the above-described one is to abut. An end side of the plate 34 abuts on the sponge packing 32, the W-pad 43 is laid over the end side of the plate 34, and a screw 35 is screwed into the screw hole 48, whereby the plate 34 is fixedly attached to each pad abutting portion 41.

Incidentally, the joint frame 40 also has a hollow portion similar to that of the above-described out-corner frame 20. The out-corner frames 20, S-pads 25, sponge packing 32, plates 34, joint frames 40, and W-pads 43 constitute the outer wall constituting member.

Figure 5:
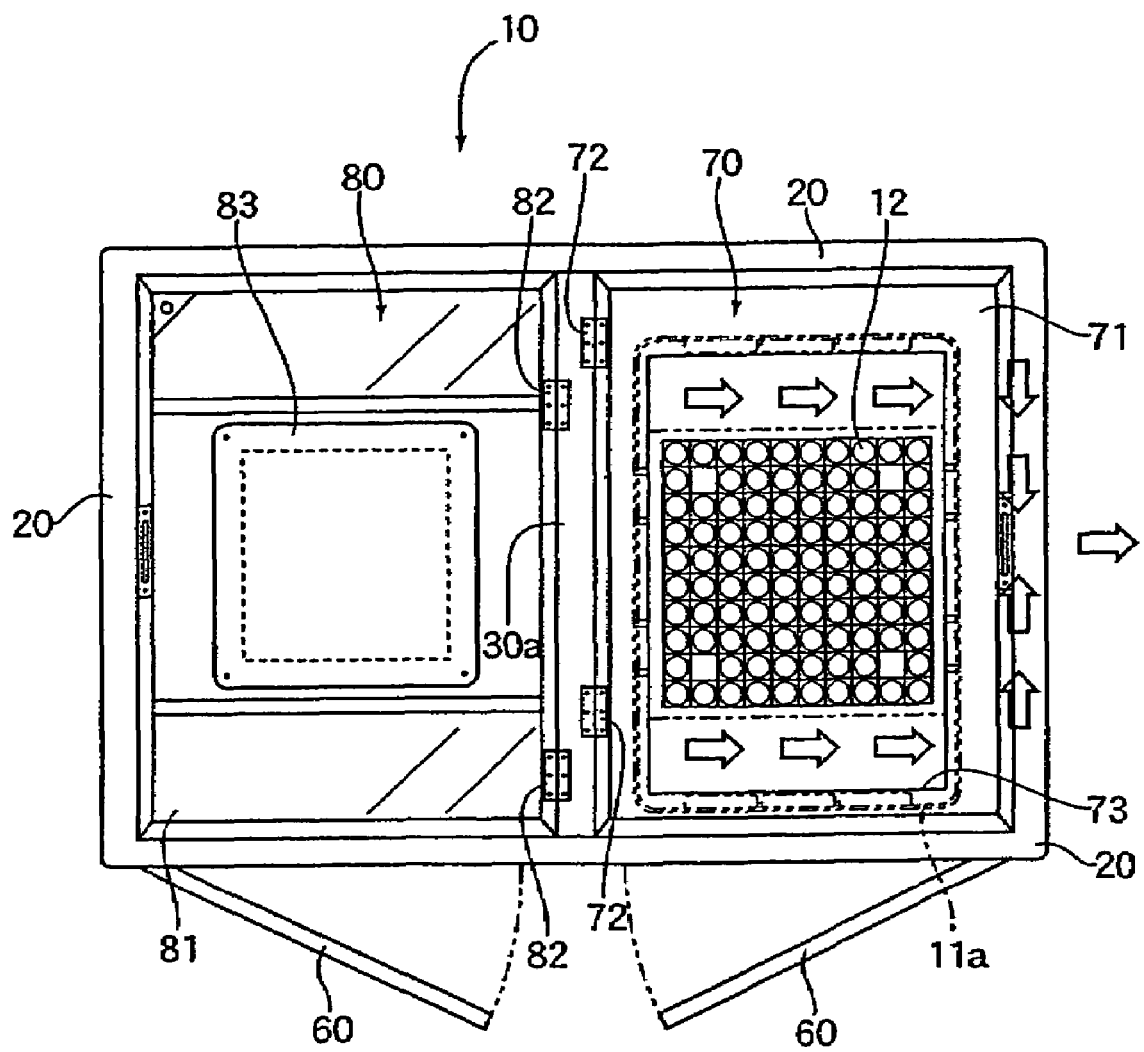
FIG. 5 is a plan view of the stocker apparatus in FIG. 1 as seen from above in a sight through manner to show an appearance of lid members and a state in which molded articles are mounted on a tray therein.

In the above-described manner, the plates 34 are fixedly attached to a periphery of the stocker apparatus 10 to constitute an outer peripheral wall. However, the outer wall on the front side of the stocker apparatus 10 is open without being covered with the plate 34 but is instead provided with two open doors 60 as shown in FIG. 2 and FIG. 5. Each of the open doors 60 is provided to be openable and closable with hinges 61 attached to the out-corner frame 20 as supporting points. The open doors 60 employ transparent plastic plates to allow for confirmation of the state of the trays 11 stacked in a first tray stock section 70 and a second tray stock section 80.

A handle 62 of each of the open doors 60 is provided on the middle of the one side surface of the open door 60. By grasping this handle 62 and opening the open door 60, many stacked empty trays 11a can be carried into the first tray stock section 70 of the stocker apparatus 10 and the loaded trays 11b loaded with the molded articles 12 can be carried out of the second tray stock section 80.

The plate 34 existing between the pair of open doors 60 is provided with on its upper side work confirmation switches 63, and provided with a warning light 64 above the stocker apparatus 10. This urges an operator to perform work of carrying in and carrying out the trays 11. Operation switches other than the work confirmation switches 63 and the warning light 64 may be provided at these locations.

On the upper surface (top surface) of the stocker apparatus 10, as shown in FIG. 5, lid members 71 and 81 are provided on the first tray stock section 70 side and on the second tray stock section 80 side respectively. The lid members 71 and 81 are provided to be openable with hinges 72 and 82 as supporting points existing at the middle portions of the upper surface. The lid member 71 on the first tray stock section 71 side is further formed with a rectangular opening 73. The opening 73 is provided to allow the molded articles 12 to be carried into the first tray stock section 70 therethrough, and is opened in a size corresponding to the molded articles 12.

As shown in FIG. 1 through FIG. 3 and FIG. 5, a HEPA filter 83 as an air cleaning means is attached to the lid member 81 on the second tray stock section 80 side. The HEPA filter 83 is for absorbing outside air and removing dust exiting in the outside air. The outside air from which dust has been removed by the HEPA filter 83 is blown downward into the second tray stock section 80 as described later. The air supplied into the second tray stock section 80 after passing through the HEPA filter 83 has been cleaned to be, for example, about class 1000. A part of the air passed through the HEPA filter 83 is also supplied to the first tray stock section 70 through an internal clearance.

Figure 6:
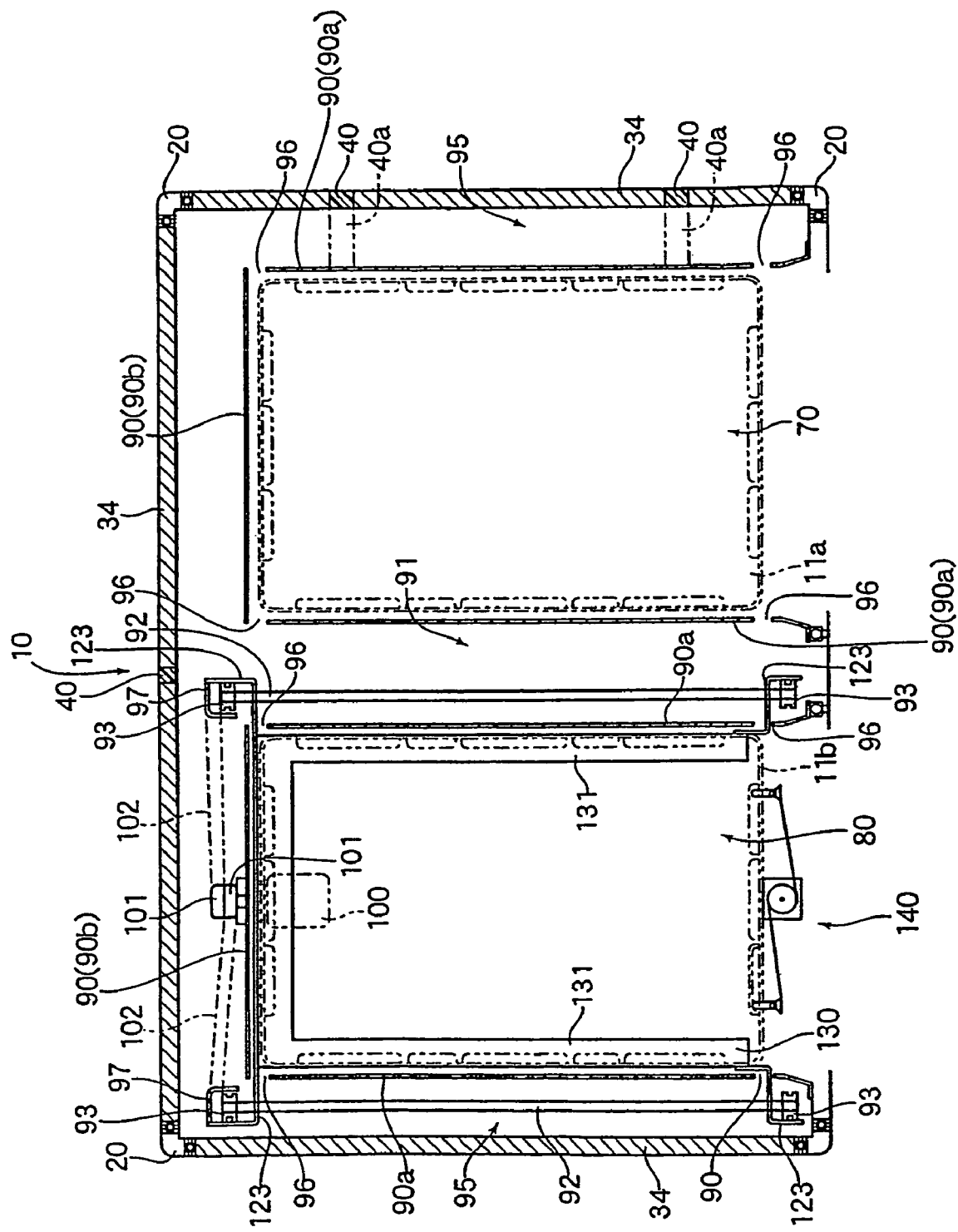
FIG. 6 is a cross-sectional view of the stocker apparatus in FIG. 1 as seen from above, showing an appearance of a first tray stock section with a driving portion being omitted and a second tray stock section including a driving portion.

Each of the first tray stock section 70 and the second tray stock section 80 is arranged, as shown in FIG. 1 and FIG. 6, such that inner wall surfaces 90 made of, for example, stainless steel as a material form a U-shape with only the open door 60 side open. This makes the structure, in which the empty trays 11a and the loaded trays 11b stacked, more insusceptible to the external atmosphere. Further, within a space between the inner wall surfaces and the plates 34 being the outer wall, various components are provided as described later.

Note that, in the following description, the inner wall surfaces 90 opposing each other out of the inner wall surfaces 90 arranged in the U-shape are called inner wall side surfaces 90a. The other inner wall surfaces 90 arranged on the back side are called inner wall back end surfaces 90b. The inner wall surfaces 90 are formed to have smooth surfaces so as to provide luster. This prevents dust from adhering to the inner wall surfaces 90.

Rotating shafts 92 (the rotating shaft 92 in the first tray stock section 70 is not illustrated in FIG. 6) are provided at a lower side in a space 91 (see FIG. 6) existing between the inner wall side surface 90a near the middle of the apparatus of the first tray stock section 70 and the inner wall side surface 90a near the middle of the apparatus of the second tray stock section 80. The rotating shaft 92 is arranged along the depth direction and provided to have a length from near the plate 34 on the back side of the space 91 to the front side near the open door 60.

On both ends of the rotating shaft 92, toothed pulleys 93 are mounted. With the toothed pulley 93, a toothed belt 94 meshes which is an annular belt. In other words, one rotating shaft 92 is configured to transmit driving force to two toothed belts 94. These toothed belts 94 extend in the vertical direction to mesh with toothed pulleys 93 existing at upper positions in the vertical direction respectively.

Further, as shown in FIG. 6, rotating shafts 92, toothed pulleys 93, and toothed belts 94 similar to the above are provided also in a space 95 between the inner wall side surface 90a near the outside of the apparatus of the first tray stock section 70 and the plate 34 constituting the outer wall, and in a space 95 between the inner wall side surface 90a near the outside of the apparatus of the second tray stock section 80 and the plate 34 constituting the outer wall. Note that illustration of these mechanisms on the first tray stock section 70 side is omitted in FIG. 6.

As shown in FIG. 1 and FIG. 6, these two rotating shafts 92 and four toothed belts 94 support at four points a later-described tray mounting member 130 for lifting and lowering the trays 11. Note that all the toothed pulleys 93 are provided to have the same number of teeth, and four toothed belts 94 to be provided in each of the first and second tray stock sections 70 and 80 are provided to have the same lifting or lowering distance so as to be synchronized with one another. Further, in this embodiment, eight toothed belts 94 in total have the same shape and the same length.

To well perform the support at four points in the first tray stock section 70 and the second tray stock section 80 surrounded by the inner wall surfaces 90, slits 96 (see FIG. 6) for leading out later-described arms 123 from the toothed belts 94 are provided between the inner wall side surfaces 90a and the inner wall back end surfaces 90b. Further, slits 96 for leading out arms 123 from the toothed belts 94 are also provided on the open door 60 side (front side) of the inner wall side surfaces 90a.

Note that the toothed belts 94 are formed of, for example, a material capable of suppressing generation of dust such as a urethane resin. This prevents generation of dust inside the stocker apparatus 10, thereby preventing the dust from adhering to the trays 11 and the molded articles 12.

Further, as shown in FIG. 1 and FIG. 6, toothed pulleys 97 are attached to ends of the rotating shafts 92 on the back side of the back-side toothed pulleys 93. To the toothed pulleys 97, driving force from drive motors 100 are transmitted via toothed pulleys 101 and toothed belts 102.

The drive motors 100 generating the driving force are provided on the lower side and the back side in the first tray stock section 70 and in the second tray stock section 80, respectively. This prevents unnecessary components from projecting outward from the stocker apparatus 10. The drive unit 100 is provided such that its one end side enters the inside from the position of the inner wall back end surface 90b, so that the drive unit 100 can be placed under a tray moving means for carrying in the trays 11.

The toothed pulley 101 for driving the rotating shaft 92 near the middle of the apparatus and the toothed pulley 101 for driving the rotating shaft 92 near the outer wall, are attached to the drive motor 100 existing in each of the first tray stock section 70 and the second tray stock section 80. In this embodiment, these two toothed pulleys 101 are equal in tooth pitch and attached to rotate in directions opposite to each other.

The drive motor 100 existing in the first tray stock section 70 and the drive motor 100 existing in the second tray stock section 80 are driven independently of each other to be able to lift and lower the later-described tray mounting members 130 independently of each other.

The rotating shafts 92, the toothed pulleys 93, the toothed belts 94, the toothed pulleys 97, the drive motor 100, the toothed pulleys 101, the toothed belts 102, and the later-described arms 123 constitute a lifting and lowering means.

Figure 8A:
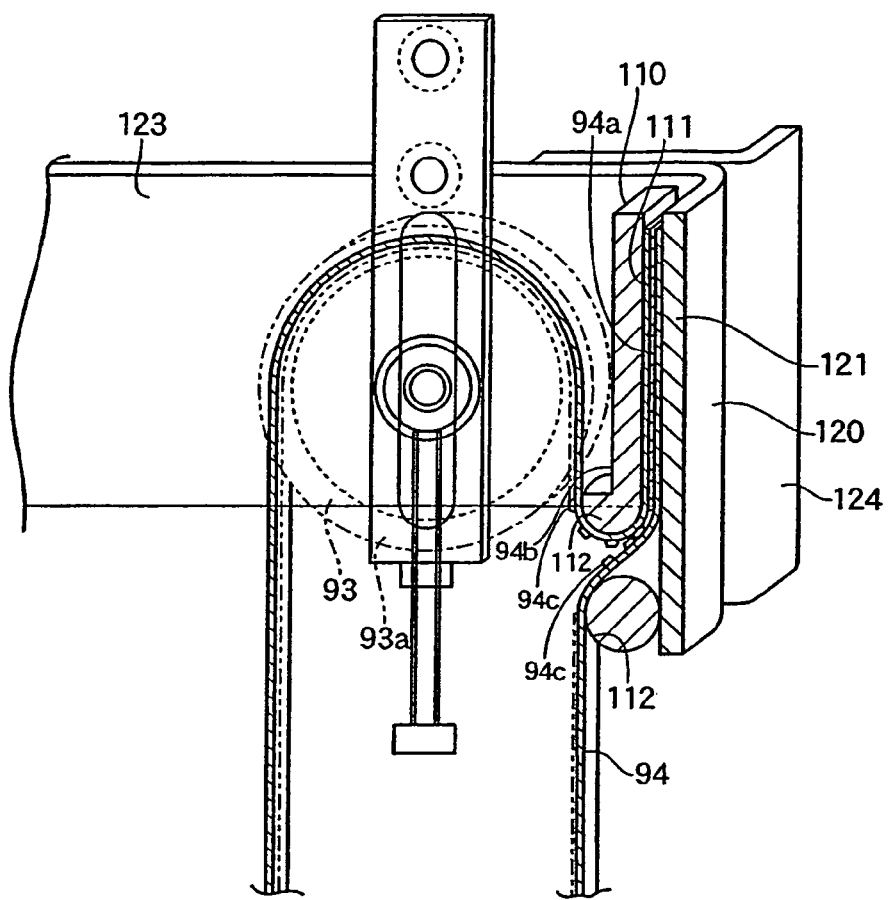
FIGS. 8A and 8B are views each showing an appearance of a both end fixing member holding a straight toothed belt in the stocker apparatus in FIG. 1, FIG. 8A being its perspective view and FIG. 8B being a partial cross-sectional view of another example.

As shown in FIG. 8A, the toothed belt 94 forms a winding round in which both end sides of a long belt are superposed and fixedly held. To fixedly hold as described above, one end side 94a of the toothed belt 94 is provided in a manner to follow a first holding member 110 constituting a both end fixing member.

The first holding member 110 is composed of a belt holding portion 111 provided in a plate shape and a belt guide portion 112 provided on one end side of the belt holding portion 111. The belt guide portion 112 is formed in an almost semicircular shape having a diameter larger than the plate thickness of the belt holding portion 111, and is configured such that the center of the diameter of the belt guide portion 112 is provided on the plate surface of the belt holding portion 111. In this embodiment, the radius of the belt guide portion 112 is sized to correspond to the plate thickness of the belt holding portion 111.

In the first holding member 110, a portion of the belt guide portion 112 projecting from the plate surface of the belt holding portion 111 is arranged to face the toothed belt 94 and an end portion on the projecting side of the belt guide portion 112 is arranged in contact with the winding round of the stretched toothed belt 94. The belt holding portion 111 and a portion of the winding round in the vertical direction opposing the belt holding portion 111 are arranged to be almost parallel to each other.

In this arrangement, one end side 94a of the toothed belt 94 is arranged following from the belt guide portion 112 toward the belt holding portion 111. Thus, as shown in FIG. 8, the one end side 94a of the toothed belt 94 deviates from the round formed by winding of the toothed belt 94 toward the outer peripheral side and is bent 180 degrees into reverse winding. The one end side 94a of the toothed belt 94 has tooth portions 94c facing the outer peripheral side.

Incidentally, when the first holding member 10 is arranged as described above and the toothed belt 94 is arranged to follow it as described above, it is possible to prevent interruption of driving transmission caused by a flange portion 93a of the toothed pulley 93 and the toothed belt 94 interfering with the belt holding portion 111. Accordingly, a wider movable range of the belt holding portion 111, that is, the arm 123 can be obtained compared to the case where the belt holding portion 111 is provided using a portion of the winding round of the toothed belt 94 as it is.

Further, another end side 94b of the toothed belt 94 is located outer to the outer peripheral side than the winding round of the toothed belt 94 and extends in the same direction as the winding direction of the toothed belt 94. The other end side 94b of the toothed belt 94 is arranged with the tooth portions 94c facing the inner peripheral side as seen from the outside. This forms a configuration in which the other end side 94b meshes with the one end side 94a of the toothed belt 94 having the tooth portions 94c facing the outer peripheral side.

To maintain this meshing state, a second holding member 120 is provided which constitutes the both end fixing member. The second holding member 120 is also composed of a belt holding portion 121 and a belt guide portion 122. The belt holding portion 121 is provided in a plate shape similarly to the above-described belt holding portion 111 of the first holding member 110. Besides, the belt guide portion 122 is formed by attaching and fixing, for example, a round bar by welding or the like at the one end side of the belt holding portion 121.

The belt guide portion 122 is arranged in contact with the outer peripheral portion of the winding round of the stretched toothed belt 94. In this case, the second holding member 120 is arranged to provide a gap between the belt guide portions 112 and 122 into which the one end side 94a and the other end side 94b of the toothed belt 94 are inserted. The belt holding portion 111 of the first holding member 110 and the belt holding portion 121 of the second holding member 120 are fixed by not-shown screws or bolts. This allows the one end side 94a and the other end side 94b of the toothed belt 94 to be held between the belt holding portion 111 and the belt holding portion 121. Incidentally, by releasing the fixation realized by the screws or bolts, the length of winding round of the toothed belt 94 can be easily adjusted.

Further, as shown in FIG. 8A, the arm 123 extends from the belt holding portion 121 of the second holding member 120. The arm 123 is a portion passed through the slit 96 and led out into each of the first tray stock section 70 and the second tray stock section 80 surrounded by the inner wall surfaces 90. This arm 123 extends from the side of the belt holding portion 121 in a direction of normal to the plate surface of the belt holding portion 121 and toward the toothed belt 94 side. The arm 123 passed through the slit 96 (see FIG. 6) is also appropriately bent so that it is suited for attachment and fixation to a side supporting member 131 (see FIG. 1).

Incidentally, this arm 123 extends in a manner to be bent not to interfere with the toothed belt 94. Further, four arms 123 are provided for each of the first tray stock section 70 and the second tray stock section 80 in correspondence with the four toothed belts 94 provided in each of the first tray stock section 70 and the second tray stock section 80. In addition, the four arms 123 extending from the toothed belts 94 are provided to be equal in height positions in each of the first tray stock section 70 and the second tray stock section 80.

A guide member 124 is further attached to a plate surface of the arm 123 opposite to the belt holding portion 121. The guide member 124 is for stabilizing slide of the arm 123. To stabilize the sliding, for example, fitting type guide rails 125 (see FIG. 4) are attached to the rear side of the joint frames 40 (the inner side of the stocker apparatus 10).

Figure 8B:
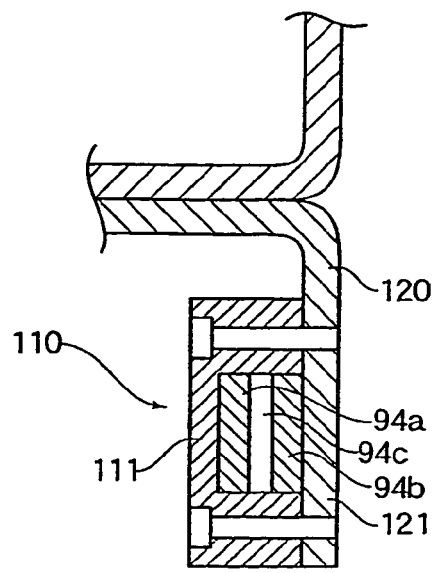

The fixation of the one end side 94a and the other end side 94b of the toothed belt 94 by the both end fixing member may be realized by a configuration shown in FIG. 8B. This configuration allows the belt to be surrounded to enable stably fixed holding thereof.

As shown in FIG. 1 and FIG. 6, to the top of the arms 123, the tray mounting members 130 as the tray supporting means are attached which project to the inside of the first tray stock section 70 and the second tray stock section 80 surrounded by the inner wall surfaces 90. The tray mounting member 130 is supported by the arms 123 and provided in an almost U-shape in appearance with only the open door 60 side open. Although the tray mounting member 130 may be configured to directly support the tray 11, it is configured to be capable of mounting a cart movable mounting the tray 11 thereon in this embodiment. The tray mounting member 130 is configured to support the tray 11 via the cart.

In this embodiment, the tray mounting member 130 is provided with the side supporting members 131 such that they are along the inner wall side surfaces 90a and parallel to the supporting base 13. The side supporting member 131 couples the two arms 123 existing on each of the inner wall side surfaces 90a. A pair of side supporting members 131 existing in each of the first tray stock section 70 and the second tray stock section 80 are provided to be at the same height respectively.

A back end supporting member 132 is also provided to couple the pair of side supporting members 131 on the inner wall back end surface 90b side. The back end supporting member 132 is coupled to the side supporting members 131 on the lower surface side. Incidentally, the back end supporting member 132 may be provided to be at the same height with the side supporting members 131.

The tray 11 is supported by the tray mounting member 130 via the cart. The tray mounting member 130 is configured to be supported at four points by the four toothed belts 94. The four point support as described above allows a heavy article such as the cart to be supported together with the tray 11 even if the arm 123 has a small thickness. When the drive motor 100 is started in the above supporting state, the tray mounting member 130 is driven in the vertical direction via the toothed belts 94. The tray mounting member 130 can be lifted and lowered in the vertical direction with the tray 11 mounted thereon.

The pair of opposing side supporting members 131 of the tray mounting member 130 forming the U-shape are provided such that a distance therebetween is smaller than the width of the cart (tray 11). This ensures that the tray mounting member 130 holds the tray 11 via the cart.

Figure 9:
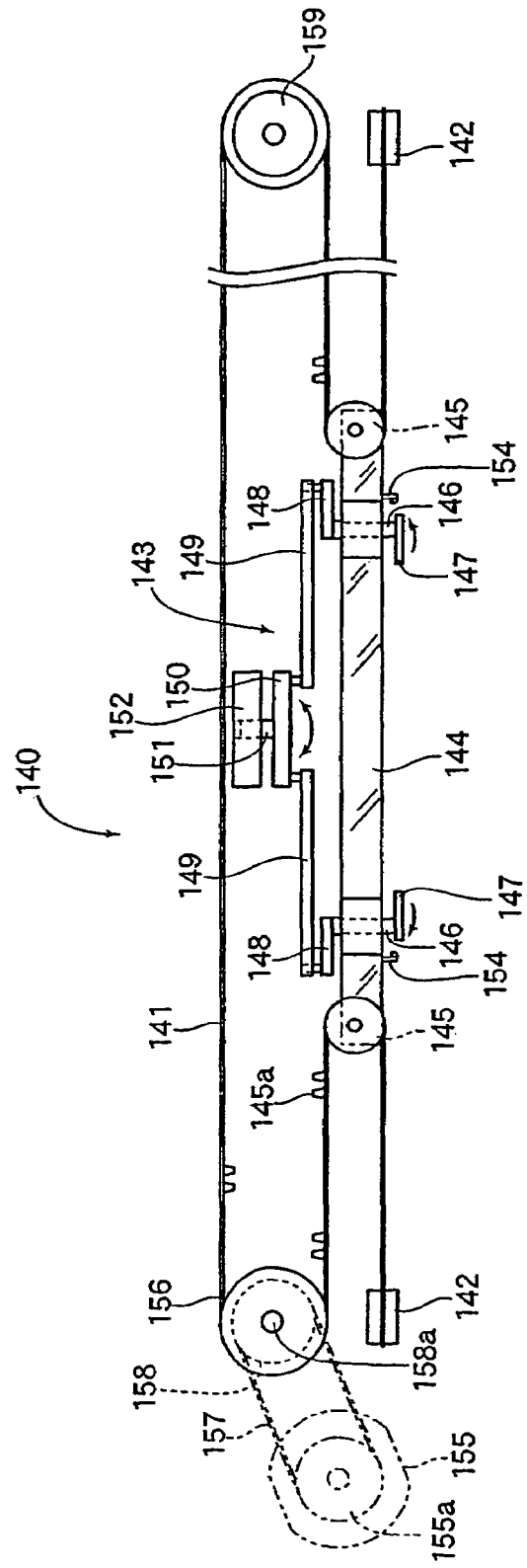
FIG. 9 is a side view showing a configuration of a tray carrying mechanism in the stocker apparatus in FIG. 1.

As shown in FIG. 9, tray carrying mechanisms 140 (only one of them is illustrated in FIG. 9) as carrier means are provided at the upper side in the stocker apparatus 10. The tray carrying mechanisms 140 are arranged such that a pair of toothed belts 141 are parallel to each other on the front side (substantially above the open doors 60) and the back side (substantially above the toothed belts 102). The pair of toothed belts 141 are straight belts having both ends respectively, and both the ends are fixedly attached to fixing members 142 at both end sides in the width direction of the inside of the stocker apparatus 10.

The tray carrying mechanism 140 has a clamping device 143. The clamping device 143 has a base 144, and a pair of driven pulleys 145 are rotatably attached to both end sides of the base 144. The toothed belt 141 is stretched between the pair of driven pulleys 145 with tooth portions 141a facing outward.

At positions on both end sides of the base 144 apart from its center by a predetermined distance, rotating shafts 146 are provided in a manner to pass it, respectively. To the lower end side of the rotating shaft 146, one end side of a plate-shaped clamping claw 147 is attached which is formed in a rectangle. This makes it possible that when the rotating shaft 146 is rotated, the clamping claw 147 projects to the inside of the first tray stock section 70 and the second tray stock section 80 or retracts from the projecting state.

To the upper end side of the rotating shaft 146, one end side of a rectangular intermediate member 148 is attached. The intermediate member 148 extends in a direction to form an angle of, for example, about 45 degrees with respect to a direction in which the clamping claw 147 extends. In addition, the intermediate member 148 extends in a diagonal direction between the longitudinal direction of the base 144 and the depth direction of the stocker apparatus 10, where the clamping claw 147 is housed with the longitudinal direction of the clamping claw 147 matching the longitudinal direction of the base 144.

To the other end side of the intermediate member 148, one end side of a coupling arm 149 is coupled. On the one end side of the coupling arm 149, a ball bearing (not shown) is provided so that the coupling arm 149 is rotatably coupled. This coupling arm 149 is a long member in a rod shape, and its other end side is similarly attached to a rotating member 150 via a ball bearing.

The rotating member 150 is coupled to a rotating shaft 151. The rotating shaft 151 is fed with driving force by an air compressor 152 as a driving source for the rotating shaft 151. Incidentally, a not-shown tube and an air device 153 (see FIG. 3) via the tube are connected to the air compressor 152 to allow air to be fed to the air compressor 152. As the driving source, a motor electrically driven may be used in place of the air compressor 152.

Further, an operating body 154 for a sensor which senses the clamping position or the clamping release position of the tray 11. This operating body 154 is used for a reflection-type optical sensor, and additionally a light transmission-type sensor or a touch sensor may be used.

The clamping device 143 described above is supported on the stretched toothed belt 141 via the above-described pair of driven pulleys 145. The toothed belt 141 is stretched, as shown in FIG. 9, around a driving pulley 155a to which driving force is transmitted from a drive motor 155 as a driving source. More specifically, the toothed belt 141 fixed to the fixing member 142 on the one end side is engaged with the driven pulley 145 to be turned 180 degrees by the driven pulley 145. The toothed belt 141 is then engaged with a driving pulley 156 and is turned 180 degrees again after passing the driving pulley 156 into the same direction as the initial direction in which the toothed belt 141 travels from the fixing member 142 on the one end side toward the driven pulley 145.

Incidentally, the driving force from the drive motor 155 is transmitted, as shown in FIG. 9, to the driving pulley 156 via a pulley 155a, a transmission belt 157 stretched around the pulley 155a, a pulley 158, and a rotating shaft 158a connecting the pulley 158 and the driving pulley 156.

The toothed belt 141 is engaged with a driven pulley 159 with a large diameter existing on the other end side, and turned 180 degrees by the driven pulley 159 toward the one end side. The driven pulley 159 is not fed with driving force but for guiding travel of the toothed belt 141. The toothed belt 141 passing the driven pulley 159 is stretched around the driven pulley 145 attached to the base 144. The toothed belt 141 is turned again into a reverse direction by the driven pulley 145, and its other end is fixed by the fixing member 142 on the other end side.

Further, an ionizer 160 which jets ionized air is provided, as shown in FIG. 1 and FIG. 2, on the upper side of the space 91 existing between the inner wall side surface 90a near the middle of the apparatus in the first tray stock section 70 and the inner wall side surface 90a near the middle of apparatus in the second tray stock section 80 (at a lower surface of a middle frame 30a being an upper surface panel existing between the lid members 71 and 81). The ionizer 160 is for jetting ionized air to ionize the air into positive ions and negative ions via a positive discharge needle and a negative discharge needle. Thus, the ionizer 160 has a not-shown ion generator near an air jetting part.

The ionizer 160 also has a pipe-shaped member 161. The pipe-shaped member 161 is provided to be hollow so as to allow air to pass therethrough. The pipe-shaped member 161 is provided long enough to have a length over the whole inside of the stocker apparatus 10 in the depth direction.

The pipe-shaped member 161 is also formed with many jetting holes 162 (see FIG. 1) to allow air to be jetted almost evenly toward the first tray stock section 70 (the jetting direction is a direction shown by arrows in FIG. 1, FIG. 2, and FIG. 5). The jetted air will include the positive ions and negative ions by means of the ion generator generating a high voltage located near the jetting holes 162.

The ion generators include a DC-type and an AC-type either of which may be used as long as it generates positive ions and negative ions in good balance. Although the AC-type generator normally provides better ion balance, the DC-type generator generates a large amount of ions.

Further, as shown in FIG. 1 and FIG. 4, an exhaust fan 170 is provided in the side surface where the opening 73 is located and at a middle height position on the outer side wall formed by the plate 34. The exhaust fan 170 is for exhausting the ionized air fed by the above-described ionizer 160 to the outside. When the exhaust fan 170 is driven, the air jetted from the jetting holes 162 of the pipe-shaped member 161 is ionized and then passes, as shown in FIG. 1 and FIG. 2, under the lid member 71, while forming a flow passage (hereinafter, referred to as a destaticizing blow portion 171) parallel to the lid member 71.

The ionized air then mainly proceeds within the space 95 between the inner wall side surface 90a and the plate 34 being the outer wall by suction force of the exhaust fan 170. The air proceeding within the space 95 reaches the exhaust fan 170 and is exhausted to the outside by the exhaust fan 170. A space surrounded by the plate 34, the inner wall side surface 90a, two inner plates 40a (the inner plates 40a are provided parallel to the joint frames 40), and a partition plate 40b horizontally laid at almost the middle of the side surface, is completely surrounded other than its upper portion, so that the ionized air entering from above can be efficiently exhausted by the exhaust fan 170.

The stocker apparatus 10 also has, as shown in FIG. 3, a controller 180 as a control means. The controller 180 is electrically connected to various driving means such as the drive motors 100 and 154, the air compressor 152, and so on, and the sensors 154 and so on to be able to control these various driving means following an operation progress program determined by the controller 180.

As shown in FIG. 2, the tray 11 used in this embodiment has two recessed portions 11c respectively, which the clamping claws 147 can enter, on each of the back side and the front side. The upper surface of the recessed portion 11c forms a locking portion 11d which can be mountable on the clamping claw 147. When the tray mounting member 130 lowers after the clamping claws 147 enter the recessed portions 11c, that is, after clamping operation, the clamping claws 147 lock the locking portions 11d so that the tray 11 is not detached from the clamping claws 147, thus grasping the tray 11.

The operation of the stocker apparatus 10 having the above-described configuration will be described below.

The operator first opens the open door 60 and pushes by hand an empty cart into the second tray stock section 80. The operator confirms that only the cart is located and no loaded tray 11b exists in the second tray stock section 80. In addition, the operator mounts many empty trays 11a on a cart and pushes by hand the cart into the first tray stock section 70. This makes the stocker apparatus 10 ready to operate. In this state, each tray mounting member 130 is lifted so that each of the carts is mounted on each tray mounting member 130.

In this case, the tray mounting member 130 is lifted or lowered so that the empty tray 11a located at the uppermost tier is positioned at a prescribed height. Normally, in order to mount a largest number of empty trays 11a on the tray mounting member 130, the empty tray 11a located at the uppermost tier of the largest number of stacked empty trays 11a is positioned at the prescribed height when the tray mounting member 130 is located at the lowermost position. The operation of positioning at the prescribed height the empty tray 11a located at the uppermost tier is controlled through use of the light reflection-type sensor located beside the empty tray 11a which senses whether an empty tray 11a exists or not.

The tray mounting member 130 is supported by the four arms 123 fixedly attached indirectly to the four toothed belts 94. In this case, the four toothed belts 94 are provided to synchronize with one another, allowing the empty tray 11a and the loaded tray 11b mounted on the tray mounting members 130 to be kept in horizontal state at all times.

Incidentally, in each of the empty trays 11a, a small tray (a tray with partitions in a grid may also be used) is previously arranged which is internally used by a user using the stocker apparatus 10. This small tray is smaller than the empty tray 11a (see FIG. 5). It is also possible to provide a partition in the empty tray 11a itself so as not to locate in the empty tray 11a the tray under inside specifications.

When the molded article 12 made of resin or the like is molded by a molding device (not shown) existing in the external part after the stocker apparatus 10 becomes ready to operate, the molded article 12 is grasped by a carrier robot (not shown) similarly provided in the external part. The molded article 12 then passes through the opening 73 of the lid member 71 and is loaded on the empty tray 11a by means of the carrier robot.

During the process of the molded article 12 being loaded on the empty tray 11a, the molded article 12 passes through the destaticizing blow portion 171. Therefore, positive charges causing the surface of the molded article 12 to be susceptible to dust adhesion are removed by passing the molded article 12 through the destaticizing blow portion 171 formed of air positively and negatively ionized. When dust electrically adheres to the molded article 12, the dust is removed electrically or by air pressure when the molded article 12 passes through the destaticizing blow portion 171. If ozone is generated, the molded article 12 is also sterilized.

When a predetermined number of molded articles 12 passed through the destaticizing blow portion 171 are loaded on the empty tray 11a, the clamping devices 143 are driven toward the first tray stock section 70, and the clamping claws 147 are turned 90 degrees from their housed state to enter the recessed portions 11c of the empty tray 11a existing at the uppermost tier (the latest loaded tray 11b by loading). When the clamping claws 147 enter the recessed portions 11c, the tray mounting member 130 lowers by a predetermined amount. This lowering amount refers to an amount to a position where the loaded tray 11b at the uppermost tier is released from stacking with the empty tray 11a at the next highest position and the loaded tray 11b when horizontally carried never interferes with the empty tray 11a at the next highest position.

The clamping devices 143 then move toward the second tray stock section 80. In the second tray stock section 80, the tray mounting member 130 is waiting at a waiting position being at the lowermost tier for receiving the loaded tray 11b. When the clamping devices 143 reach a delivery position of the loaded tray 11b, the tray mounting member 130 is lifted to come into light contact with the lower surface of the loaded tray 11b being a surface to be loaded on the cart.

In this state, the clamping devices 143 turn the clamping claws 147 to house them, thereby releasing clamping. Thus, holding of the loaded tray 11b by the clamping devices 143 is released and delivery of the loaded tray 11b to the tray mounting member 130 by the clamping devices 143 is finished.

Incidentally, after the loaded tray 11b is delivered, the tray mounting member 130 existing in the second tray stock section 80 lowers by one tier to be ready for loading of a next loaded tray 11b.

The second tray stock section 80 to which the loaded tray 11b has been delivered is fed with clean air which has been cleaned by passing through the HEPA filter 83. In addition to that, air existing inside the stocker apparatus 10 is exhausted from the clearance included in the stocker apparatus 10, in particular, from the lower portion since its lower portion is open. This clean air is set, for example, to be about class 1000. Accordingly, the second tray stock section 80 is filled with the clean air at all times, so that it is kept cleaned, unlike the external atmosphere.

After repetition of the above-described loading and carrying operations of the trays 11, there is no more empty tray 11a in the first tray stock section 70 and the second tray stock section 80 is filled with the loaded trays 11b. In this case, the warning light 64 operates to turn on, thereby warning the operator. The operator then mounts a predetermined number of new empty trays 11a stacked one on the other on the tray mounting member 130 via the cart in the first tray stock section 70. The operator also takes out the loaded trays 11b, which have been loaded and stacked one on the other, together with the cart from the second tray stock section 80 and carries them to a predetermined position.

Preferably, a cover is put over the loaded tray 11b at the uppermost tier for carriage of the loaded trays 11b. This can prevent dust from adhering to the loaded tray 11b at the uppermost tier and the loaded molded articles 12.

It is also preferable to move the stocker apparatus 10 as a whole to the predetermined position through a device such as provision of wheels on the stocker apparatus 10 or the like. It is also possible to transfer to the cart the trays 11b to be directly mounted on the tray mounting member 130 or to mount the trays 11a on the tray mounting member 130, instead of mounting the trays 11a and 11b together with the carts for carrying them into the first tray stock section 70 and the second tray stock section 80.

Incidentally, sound may be reported with the lighting of the warning light 64. Further, when the operator confirms the work, the operator pushes the work confirmation switch 63. This can prevent a mistake in carriage of the trays 11.

With the stocker apparatus 10 thus configured, the plates 34 and the lid members 71 and 81 shied the stocker apparatus 10 from the external atmosphere so that its inside is surrounded by them. Accordingly, it is possible to prevent the dust from adhering to the trays 11 stocked in the first tray stock section 70 and the second tray stock section 80, if the external atmosphere has a large amount of dust. It is also possible to prevent the dust from adhering to the molded articles 12 loaded on the trays 11.

By preventing dust from adhering to the trays 11 and the molded articles 12 as described above, when the molded articles 12 are those, for example, for treating food such as egg cases, they can be kept in a good sanitary condition. In addition, by preventing adhesion of dust, bacteria existing in the dust can be prevented from adhering to the trays 11 and the molded articles 12. Even when the molded articles 12 are precision components, cleaning of them can be omitted or simplified.

Besides, the plates 34 are attached to the frames 20 and 40 via the sponge packing 32. This more surely seals the inside of the stocker apparatus 10 to prevent dust from entering the stocker apparatus 10. Thus, the stocker apparatus 10 in this embodiment is configured to keep air tightness using the sponge packing 32 to prevent dust from entering it, ensuring that the trays 11 and the molded articles 12 existing therein can be stocked in a clean state.

The lid member 71 is provided with the opening 73 through which the molded articles 12 are carried to the empty trays 11a existing in the first tray stock section 70. In this case, the carriage of the molded articles 12 to the empty trays 12a can be performed with ease and the opening required to carry in the molded articles 12 can be minimized.

The ionizer 160 is further provided near the opening 73 of the stocker apparatus 10. This allows the molded articles 12 to pass through the destaticizing blow portion 171 when passing through the opening 73. Therefore, the ionized air is blown to the molded articles 12 from which electricity is eliminated so that dust becomes hard to adhere to the molded articles 12, thus removing dust adhering to the molded articles 12. In particular, charged dust is well removed by the ionized air.

If ozone is generated in addition to the ionized air, the ozone could be blown to the products 12 to sterilize them.

Further, the lid member 81 at the upper portion of the second tray stock section 80 is provided with the HEPA filter 83. Provision of the HEPA filter 83 can clean air taken in from the outside. In this embodiment, the air is cleaned to about class 1000. The air is fed into the second tray stock section 80 after the cleaning treatment is performed as described above, the second tray stock section 80 can keep its atmosphere clean.

By keeping the atmosphere in the second tray stock section 80 clean, dust can be prevented from adhering to the loaded trays 11b and the molded articles 12 loaded on the loaded trays 11b. Further, the cleaned air also flows into the first tray stock section 70 via clearances, so that the atmosphere in the first tray stock section 70 can also be kept clean.

Besides, one end side and the other end side of the toothed belt 94 are superposed and fixedly held between the first holding member 110 and the second holding member 120, whereby the toothed belt 94 forms an annular belt. The first holding member 110 and the second holding member 120 are used to fixedly hold a straight belt with its both ends superposed, whereby the belt length of the toothed belt 94 being the annular belt can be freely set and arbitrarily adjusted. This eliminates the necessity to use an expensive endless toothed belt, resulting in reduced cost.

The both end fixing member composed of the first holding member 110 and the second holding member 120 is located outside the winding round of the annular toothed belt 94. This can prevent the both end fixing member from interfering with the toothed pulley 93. By prevention of interference between the toothed pulley 93 and the both end fixing member, the driving distance of the toothed belt 94 to which the tray mounting member 130 is attached can be increased. This improves the space efficiency in the stocker apparatus 10, which allows much more trays 11 to be stocked therein. In addition, the effective use of the space in the stocker apparatus 10 can also lead to a reduction in size of the stocker apparatus 10.

As the straight belt, the toothed belt 94 having the tooth portions 94c thereon is used such that the one end side 94a of the toothed belt 94 is bent 180 degrees toward the opposite direction and then superposed on the other end side 94b of the toothed belt 94 to be held by the belt holding portion 111 of the first holding member 110 and the belt holding portion 120 of the second holding member 120.

As described above, the straight belt is used as the toothed belt 94 whose one end side 94a is bent 180 degrees and then one end side 94a and the other end side 94b are superposed, so that the tooth portions 94c on the one end side 94a and the tooth portions 94c on the other end side 94b mesh with each other without gap therebetween. Such holding after the superposition allows the tooth portions 94c in mesh to prevent slippage of the toothed belt 94. In addition, the space where the one end side 94a and the other end side 94b are superposed can be reduced.

Although one embodiment of the present invention has been described, various modifications can also be made in the present invention in addition to the above. They will be described below.

Although the stocker apparatus 10 in the above-described embodiment comprises all of the outer wall constituting member, the HEPA filter 83, the ionizer 160, sealing of the plates 34 by the sponge packing 32, and the toothed belt 94 formed in an annular shape formed by holding both ends of a straight belt, the stocker apparatus 10 may comprise at least only one or some plural components of them. A structure, which can well shield the inside of the stocker apparatus 10 from the outside, provides cleaning effects and therefore may have any configuration for other parts.

In the above-described embodiment, the tray mounting member 130 is formed in a U-shape. This mounting member 130, however, is not limited to that formed in the U-shape, but may employ a flat plate or may be composed of only a pair of side supporting members 131, and otherwise can be variously modified.

Further, in the above-described embodiment, the rotating shafts 92, the toothed pulleys 93, the toothed belts 94, the toothed pulleys 97, the drive motor 100, the toothed pulleys 101, the toothed belts 102, and the later-described arms 123 constitute the lifting and lowering means. The lifting and lowering means is not limited to this but, for example, a hydraulic jack or the like may be used, and any other means may be employed as long as it can well lift and lower the tray mounting member 130.

Besides, the tray carrying mechanism 140 is not limited to the above-described configuration, but may employ any configuration as long as it is movable while clamping the tray 11. An example of a configuration of the other tray carrying mechanism is a rail provided at the upper side of the stocker apparatus 10 along which a clamping mechanism like the clamping device 143 travels by itself.

Further, the stocker apparatus 10 solely used is described in the above-described embodiment which has one each of the first tray stock section 70 for the empty trays 11a and the second tray stock section 80 for the loaded trays 11b. The stocker apparatus 10, however, is not limited to the case where it is solely used, but a plurality of stocker apparatuses 10 may be connected for use, with one stocker apparatus 10 being regarded as one module. When many stocker apparatuses 10 are connected, many molded articles 12 can be simultaneously loaded on the trays 11 and many kinds of molded articles 12 can be loaded on the trays 11 separately by kinds of the molded articles 12.

Although the structure in which the opening 73 is formed in the lid member 71 is described in the above-described embodiment, the opening 73 may be formed, for example, in the inner wall back end surface 90b, or the molded articles 12 may be loaded on the tray 11 after the open door 60 is opened.

Further, the HEPA filter 83 is used as the air cleaning means in the above-described embodiment, but the air cleaning means is not limited to the HEPA filter 83, and for example, a water jet-type air cleaning means may be used.

Although the toothed belt 94 is used in the above-described embodiment, a V-belt or a chain may be used instead of using the toothed belt 94. Further, it is not necessary to use the toothed belt 94 composed of the straight belt, but a toothed belt 94 may be used which is previously formed into an annular belt. The configuration of the both end fixing means that fixes both ends of the toothed belt 94 is not limited to a configuration to hold them using the above-described first holding member 110 and second holding member 120. For example, the one end side 94a is simply bent, the other end side 94b is laid over it, and both ends of the toothed belt 94 are simply held between two metal plates which are clamped by screws.

In the above-described embodiment, the case in which the products are the molded articles 12 made of resin is described. The stocker apparatus 10, however, can be used for products including, but not limited to the molded articles 12 made of resin, various kinds of products such as various precision electronic components and precision mechanical components, ceramic products, optical components, and so on.

Besides, in the above-described embodiment, the trays 11 at the uppermost tiers are completely housed in the first tray stock section 70 and the second tray stock section 80 (see FIG. 2). However, the tray 11 at the uppermost tier may be lifted up to a position where its top end is almost flush with the upper surface of the opening 73. When the tray 11 at the uppermost tier may be lifted up such that its top end is almost flush with the upper surface with the opening 73, the products can be stocked on the tray 11 without using the carrier robot.

More specifically, if the tray 11 is not lifted up to the position where the top is flush with the upper surface, unlike the above arrangement, the products molded or the like will be once mounted on a product storage place, and then put into (stocked in) the tray 11 using the carrier robot. In other words, when the carrier robot is not used, the product extracted by an extractor is mounted on the tray 11 at the uppermost tier of stacked trays 11 in a manner to be dropped thereinto, which is not preferable. On the other hand, if the tray 11 is lifted up to the position where the top is flush with the upper surface as described above, it becomes possible, in loading the products into the tray 11, to easily mount the products on the tray 11 at the uppermost tier, without dropping, only by a standard extractor without using the carrier robot.

Incidentally, when the tray 11 at the uppermost tier is lifted up to the position where its top is almost flush with the upper surface of the opening 73, the attachment position of the ionizer 160 may be moved to an upper position. This arrangement allows the ionized air to be well blown to the molded articles 12 so as to eliminate electricity from the molded articles, thereby removing dust.

Figure 10:
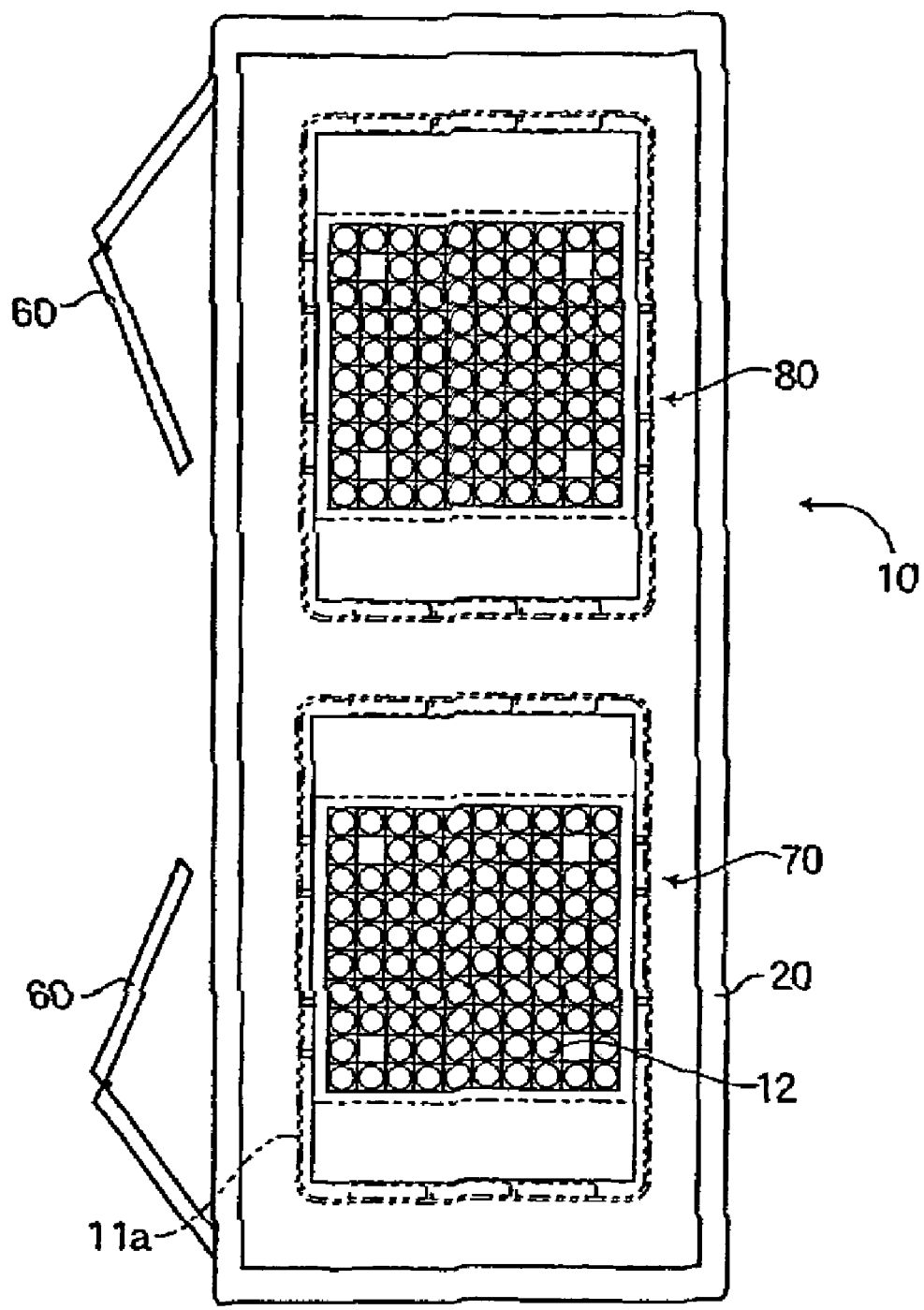
FIG. 10 is plan view showing a configuration of a stocker apparatus according to a modification example of the stocker apparatus in FIG. 1, in which a first tray stock section and a second tray stock section are longitudinally arranged.

Besides, the configuration in which the first tray stock section 70 and the second tray stock section 80 are laterally arranged as shown in FIG. 5 (the configuration in which long longitudinal portions are arranged adjacent and in parallel to each other) is described in the above-described embodiment. The stocker apparatus 10, however, may be configured such that the first tray stock section 70 and the second tray stock section 80 are, for example, longitudinally arranged as shown in FIG. 10 (the configuration in which short lateral portions are arranged adjacent and in parallel to each other). Incidentally, each open door 60 is configured to be opened folded in two in the stocker apparatus 10 shown in FIG. 10.

INDUSTRIAL AVAILABILITY

The stocker apparatus of the present invention can prevent dust from adhering to the trays stocked in the first tray stock section and the second tray stock section even when the external atmosphere contains a large amount of dust. Further, it is also possible to prevent the dust from adhering to the products loaded on the empty tray.

Further, the opening is provided at a part of an area formed by the outer wall constituting member, whereby the opening portion running through the outside can be minimized.

Further, the ionizer is provided near the opening, thereby removing the dust adhering to the products. In particular, dust apt to adhere to charged products no longer adheres to the products by eliminating electricity from the products by the ionized air. Further, the ionized air can also be used to perform sterilization treatment on the products.

Further, in the second tray stock section, the cleaned air moves downward from above, thus keeping the atmosphere therein clean.

Further, in the stocker apparatus of the present invention, the outer wall constituting member can seal the inside of the stocker apparatus without generating dust from screw holes and so on when panel members are attached. This can prevent dust from entering the inside of the stocker apparatus from the outside and the panel member portion, thus stocking the trays and the products loaded on the trays in a clean state.

Further, in the stocker apparatus of the present invention, the both end fixing member is used to fixedly hold the straight belt with its both ends superposed, whereby the belt length of the annular belt can be freely set by arbitrarily adjusting the length where the one end side and the other end side are superposed. This eliminates the necessity to use an endless belt which is initially formed in an annular shape, resulting in reduced cost relative to use of the endless belt.

Further, the both end fixing member can be located outside the winding round of the annular belt to prevent the both end fixing member from interfering with the pulley around which the annular belt is stretched. As a result of this, the driving distance of the annular belt to which the tray supporting means is attached can be increased. This improves the size efficiency of the stocker apparatus, which allows much more trays to be stocked therein. In addition, the stocker apparatus can be reduced in size.

While the present invention has been particularly shown and described in conjunction with a preferred embodiment thereof, it will be readily appreciated by those of ordinary skill in the art that various changes may be made without departing from the spirit and scope of the invention. Therefore, it is intended that the appended claims be interpreted as including the embodiments described herein, the alternatives mentioned above, and all equivalents thereto.

The invention claimed is:

1. A stocker apparatus comprising:

a first tray stock section capable of stocking a plurality of empty trays;

a second tray stock section capable of stocking a plurality of loaded trays, the loaded trays being the empty trays loaded with products;

tray supporting means provided in said first tray stock section and said second tray stock section respectively for supporting the trays;

lifting and lowering means for lifting and lowering said tray supporting means; and carrier means for carrying the loaded tray to said second tray stock section when the products are loaded on the empty tray existing in said first tray stock section, said apparatus further comprising:

an outer wall constituting member covering at least side surfaces and upper surfaces of said first trays stock section and said second tray stock section to separate said first tray stock section and said second tray stock section from an external atmosphere;

an opening provided at an upper portion of said first tray stock section, said opening allowing the products to be carried in therethrough;

an ionizer provided near said opening and disposed between the first tray stock and the second tray stock, said ionizer jetting ionized air to the products carried in through said opening by jetting ionized air from the ionizer in a horizontal direction and in a diagonally downward direction towards said opening, said horizontal direction being opposite to a direction of transport of the products and said jetting being from a side of said opening near said ionizer to the other side of said opening so as to remove contaminants and dust from the transported products and said ionized air passing under a lid member, while forming a flow passage parallel to the lid member, and then mainly proceeds within a space disposed between an inner wall side surface and a plate being the outer wall by suction force of an exhaust fan, so that the air proceeding within the space reaches the exhaust fan and is exhausted to an outside of the stocker apparatus by the exhaust fan, the products then being loaded on the empty tray; and an air cleaning means provided at an upper portion of said second tray stock section, said air cleaning means cleaning outside air and then introducing the air into said second tray stock section, wherein the products that are loaded on the empty tray existing in said first tray stock section are carried within the loaded tray to said second tray stock section, and are stocked in said second tray stock section that has air cleaned by said air cleaning means.

2. The stocker apparatus according to claim 1, wherein said outer wall constituting member includes a frame, an elastically deformable sealing member abutting on the frame in a longitudinal direction thereof, a panel member abutting on the sealing member, and a pad member abutting on the panel member in a manner to cover an outer edge thereof and fixedly attached to a frame member to thereby elastically hold the panel member with the sealing member therebetween.

3. The stocker apparatus according to claim 1, wherein each of said lifting and lowering means has four annular belts for supporting each of said tray supporting means at four points, the annular belt being formed by superposing one end on another end of a straight belt having both the ends and fixedly holding the ends by a both end fixing member, and the both end fixing member being located outside a winding round of the annular belt.

4. The stocker apparatus according to claim 3, wherein the straight belt is a straight toothed belt, and one end side or another end side of the straight toothed belt is bent 180degrees and then the one end side and the other end side are superposed and fixedly held by the both end fixing member.

5. A stocker apparatus comprising:

a first tray stock section capable of stocking a plurality of empty trays;

a second tray stock section capable of stocking a plurality of loaded trays, the loaded trays being the empty trays loaded with products;

tray supporting means provided in said first tray stock section and said second tray stock section respectively for supporting the trays;

lifting and lowering means for lifting and lowering said tray supporting means;

carrier means for carrying the loaded tray to said second tray stock section when the products are loaded on the empty tray existing in said first tray stock section; and an air cleaning means provided at an upper portion of said second track stock section, said air cleaning means cleaning outside air and then introducing the air into said second tray stock section, said apparatus further comprising:

an outer wall constituting member covering at least side surfaces and upper surfaces of said first trays stock section and said second tray stock section to separate said first tray stock section and said second tray stock section from an external atmosphere;

an opening provided at an upper portion of said first tray stock section, said opening allowing the products to be carried in therethrough; and an ionizer provided near said opening and disposed between the first tray stock and the second tray stock, said ionizer jetting ionized air to the products carried in through said opening by jetting ionized air from the ionizer in a horizontal direction and in a diagonally downward direction towards said opening, said horizontal direction being opposite to a direction of transport of the products and said jetting being from a side of said opening near said ionizer to the other side of said opening so as to remove contaminants and dust from the transported products and said ionized air passing under a lid member, while forming a flow passage parallel to the lid member, and then mainly proceeds within a space disposed between an inner wall side surface and a plate being the outer wall by suction force of an exhaust fan, so that the air proceeding within the space reaches the exhaust fan and is exhausted to an outside of the stocker apparatus by the exhaust fan, the products then being loaded on the empty tray, wherein said outer wall constituting member includes a frame, an elastically deformable sealing member abutting on the frame in a longitudinal direction thereof, a panel member abutting on the sealing member, and a pad member abutting on the panel member in a manner to cover an outer edge thereof and fixedly attached to a frame member to thereby elastically hold the panel member with the sealing member therebetween, and the products that are loaded on the empty tray existing in said first tray stock section are carried within the loaded tray to said second tray stock section, and are stocked in said second tray stock section that has air cleaned by said air cleaning means.

* * * * *